United States Patent

Kumazaki

[11] Patent Number: 5,595,533
[45] Date of Patent: Jan. 21, 1997

[54] V-RIBBED BELT AND GRINDING WHEEL FOR FORMING THE BELT

[75] Inventor: Toshimi Kumazaki, Kobe, Japan

[73] Assignee: Mitsuboshi Belting Ltd., Nagata, Japan

[21] Appl. No.: 538,781

[22] Filed: Oct. 3, 1995

Related U.S. Application Data

[62] Division of Ser. No. 271,351, Jul. 6, 1994, Pat. No. 5,492,507.

[30] Foreign Application Priority Data

Jul. 7, 1993 [JP] Japan .................................. 5-193211

[51] Int. Cl.$^6$ .................................................. B23F 21/03
[52] U.S. Cl. .................................................. 451/541; 451/542
[58] Field of Search .................................. 451/541, 542, 451/547, 50

[56] References Cited

U.S. PATENT DOCUMENTS

| | | | |
|---|---|---|---|
| 2,144,987 | 8/1936 | Miller | 451/541 |
| 2,394,326 | 8/1946 | Newnham | 451/541 |
| 2,982,060 | 5/1961 | Klingspor | 451/541 |
| 3,708,925 | 1/1973 | Ainoura | 451/541 |
| 4,354,328 | 10/1982 | Ainoura | 451/542 |

OTHER PUBLICATIONS

European Patent Office Abstracts of Japan Publ. No. JP5042468.
European Patent Office Abstracts of Japan Publ. No. JP62113940.
European Patent Office Abstracts of Japan Publ. No. JP1188333.

*Primary Examiner*—Bruce M. Kisliuk
*Assistant Examiner*—George Nguyen
*Attorney, Agent, or Firm*—Wood, Phillips, VanSanten, Clark & Mortimer

[57] ABSTRACT

A power transmission belt having an endless body with a length and defining an elongate rib. The body has an inside, an outside, and laterally spaced sides. The rib has an exposed surface to engage with a cooperating pulley. At least a first portion of the exposed rib surface is formed by at least one of grinding and cutting. There is a second portion of the exposed surface that is neither cut nor ground during formation of the power transmission belt.

13 Claims, 2 Drawing Sheets

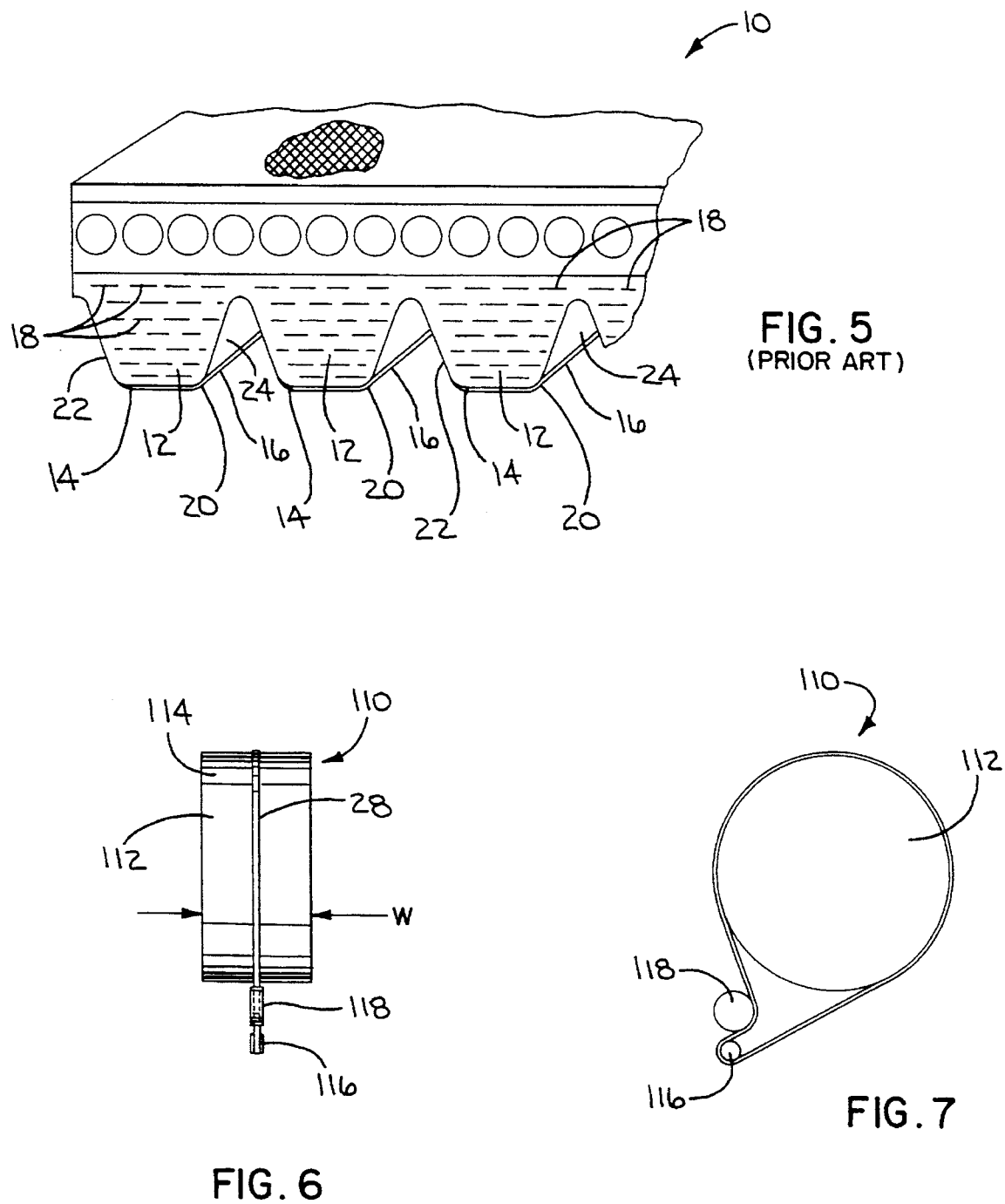

V-RIBBED BELT AND GRINDING WHEEL FOR FORMING THE BELT

This is a division of application Ser. No. 08/271,351, filed Jul. 6, 1994, now U.S. Pat. No. 5,492,507.

BACKGROUND OF THE INVENTION

1. Field of the Invention

This invention relates to power transmission belts and, more particularly, to a power transmission belt having at least one rib with a discrete projection thereon that reduces the tendency of the rib to develop cracks in operation. The invention is further directed to a grinding wheel to form one or more ribs, according to the invention, on a power transmission belt.

2. Background Art

V-ribbed belts are used in a wide range of environments. V-ribbed belts are preferred for their high power transmission capability which is attributable to the increase in contact area between the ribs on the belt and cooperating pulleys.

In operation, there is a tendency of the ribs on this type of belt to crack. These cracks typically originate at the free ends of the ribs, remote from the roots thereof, or at the transition between the inwardly (or outwardly in the event of a double-ribbed belt) facing rib surface portions and the pulley-engaging side surface portions. These cracks tend to grow as the belt operates and may progress to the point that the ribs chip. The cracks may ultimately extend fully to the load-carrying cords, which may sever. The result is that the performance of the belt may be comprised. Premature failure may also result.

This cracking problem is particularly prevalent in serpentine drive systems in which a flat, outside surface of the V-ribbed belt is forcibly engaged by a flat pulley. These systems, typically used on automobile engines have idler pulleys with flat surfaces to be pressed against the back surface of the belt to maintain a desired tension thereon.

One attempted solution to this cracking problem is described in Japanese Patent Publication No. 59-4196. FIG. 5 herein shows a belt incorporating the invention in Japanese Patent Publication No. 59-4196. The V-ribbed belt at 10 in FIG. 6 has a plurality of ribs 12, each having a free end with an inwardly facing surface portion 14. A thin layer 16 of elastic rubber is applied to the surface portion 14. The belt 10 has a plurality of laterally extending, short fibers 18 embedded in the ribs 12 for reinforcement thereof.

The ribs 12 are typically formed using a cutting or grinding wheel having surfaces that are roughened by abrasion or by adhering thereto diamond particles through an electrodeposition process. The roughened cutting/grinding surfaces tend to tear the embedded, short fibers 18 out of the ribs 12 at the surface portion 14 and/or at convex transition surface portions 20 between the surface portion 14 and the pulley-engaging side surface portions 22,24.

While the tearing out of the fibers creates only a slight scratch on the exposed belt surface, the scratches tend to grow, particularly when the belt 10 is run under severe conditions, such as at high temperatures or when it is wrapped around a small diameter pulley and is required to severely flex.

Another problem with the prior art belt in FIG. 5 is that the entire exposed surface of the ribs 12 is cut/ground during manufacture. The rib rubber is removed in chips which must be cleaned away from the working area and disposed of as industrial waste.

SUMMARY OF THE INVENTION

In one form of the invention, a power transmission belt is provided having an endless body with a length and defining an elongate rib. The body has an inside, an outside, and laterally spaced sides. The rib has an exposed surface to engage with a cooperating pulley. At least a first portion of the exposed rib surface is formed by at least one of grinding and cutting. There is a second portion of the exposed rib surface that is neither cut nor ground during formation of the power transmission belt.

By reason of the above construction, the amount of removed rubber material, in the form of chips, can be reduced over prior art belts in which the entire exposed inside or outside surface of the belt is cut or ground during manufacture.

In one form, there is a projection on the rib and the second portion of the exposed rib surface is at least partially on the rib projection. The projection is in a preferred form a discrete projection which extends continuously along the entire length of the rib.

The projection may have a squared configuration as viewed in cross-section taken at a right angle to the length of the rib.

With the above construction, the tendency of the rib to crack during operation is reduced over a belt lacking the projection.

The projection preferably has a height between the inside and outside of the belt that is not greater than 1.0 mm and in another form not greater than 0.3 mm.

In one form, the rib has a free end portion having a first surface portion facing in one of an inside and outside direction, and laterally spaced pulley-engaging surface portions between which the first surface portion resides. The projection resides between the pulley-engaging side surface portions.

The first surface has first and second parts on opposite sides of the projection. At least a portion of at least one of the first and second parts of the first surface portion has a convex configuration.

At least a portion of at least one of the pulley-engaging side surface portions also has a convex configuration.

In one form, the exposed rib surface has a part thereof defined by an arc of a circle, which arc extends continuously from one of the pulley-engaging rib surface portions to the first surface portion to define a part of the first surface portion. The exposed rib surface portion defined by the arc of a circle may terminate at the projection.

The power transmission belt may be a V-belt, a V-ribbed belt, or the like, wherein the rib(s) extends continuously along the length of the body.

The belt body has a compression section. A plurality of laterally extending fibers can be provided in the compression section, which fibers have a length of 2–10 min.

The compression section is normally made at least partially from rubber, with the fibers embedded in the rubber in an amount from 5–30 weight parts of fiber per 100 weight pans of rubber. The fibers in the compression section may be at least one of a) a synthetic fiber yarn having monofilaments of one of nylon, vinylon, polyester, and aramid, and b) natural fiber yarn that is at least one of cotton and pulp.

In one form, the belt body has a cushion rubber layer with there being a load-carrying member in the cushion rubber layer.

The cushion rubber layer may be at least one of chloroprene rubber (CR), hydrogenated nitrile rubber (HNBR), CSM rubber, natural rubber (NR), styrene-butadiene rubber (SBR), and butadiene rubber (BR).

The load-carrying member embedded in the cushion rubber layer may be made from at least one of polyester, nylon and aramid fiber.

In one form, the cushion rubber layer has an inside surface and an outside surface and there is at least one canvas layer on one of the inside and outside surfaces of the cushion rubber layer. The canvas layer may be impregnated with rubber and is made from warp and weft yarns woven to be extendable in a lengthwise direction, with the yarns being at least one of cotton and a blend of cotton and synthetic material.

The invention further contemplates a power transmission belt having an endless body with a length and defining an elongate rib. The body has an inside, an outside and laterally spaced sides. The rib has an exposed surface to engage with a cooperating pulley, and a free end portion having a first surface portion facing in one of an inside and outside direction. There is a discrete projection on the first surface portion, which projection has a height between the inside and outside of the belt that is not greater than 0.3 mm.

In one form, the power transmission belt is a V-ribbed belt with a plurality of ribs having the construction described above.

The discrete projection can have a flat surface facing in one of an inside and an outside direction on the belt.

The invention further contemplates a grinding wheel for producing a V-shaped rib on a power transmission belt. The grinding wheel has a cylindrical body with a central axis. A plurality of radial projections are provided with there being lacing grinding surface portions on axially adjacent projections. A radially facing base surface portion is provided between axially adjacent projections. An undercut extends radially inwardly from the base surface portion and continuously through 360° around the cylindrical body.

The undercut preferably has a radial extent of at least 1.0 mm inwardly of the base surface portion.

The radially extending projections have a radial outermost edge that is convex.

The facing grinding surface portions are toughened by the deposit of a material thereon or by abrading or otherwise treating the grinding surface portions. The deposited particles may be made from diamond.

The base surface portion and facing grinding surface portions are joined by a concave surface portion. The concave surface portion may be defined by the arc of a circle.

BRIEF DESCRIPTION OF THE DRAWINGS

FIG. 5 is a fragmentary, cross-sectional, perspective view of a prior art. V-ribbed belt;

FIG. 6 is a schematic, side elevation view of a drive system for a pulley on a conventional washing or drying machine with a V-ribbed belt thereon; and FIG. 7 is a side elevation view of the system of FIG. 6.

DETAILED DESCRIPTION OF THE DRAWINGS

Figure 1:
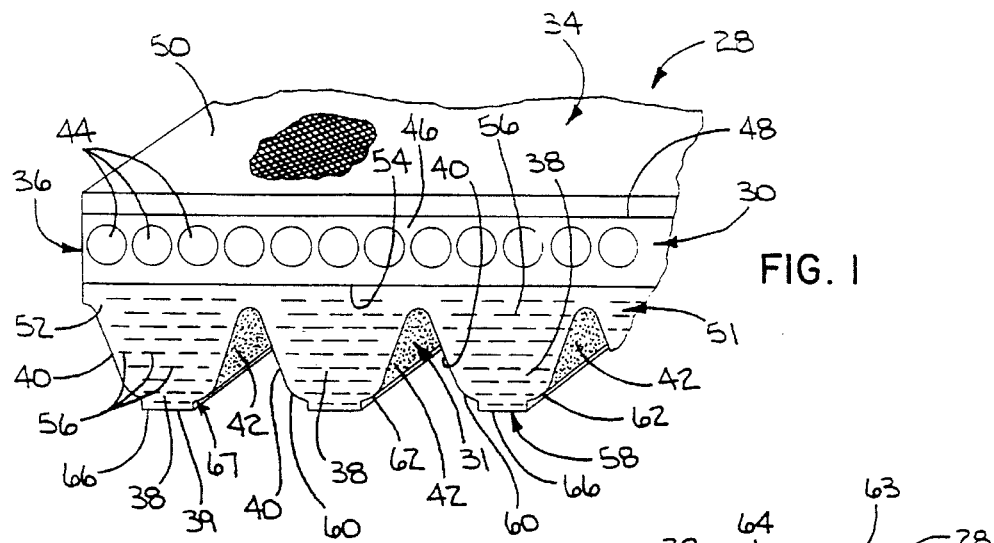
FIG. 1 is a fragmentary, cross-sectional, perspective view of a V-ribbed belt according to the present invention.
Figure 2:
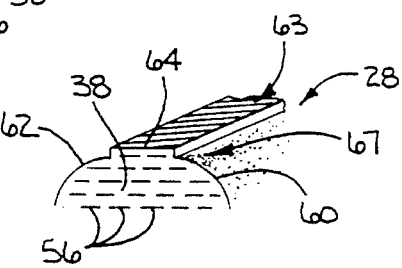
FIG. 2 is an enlarged, fragmentary perspective view of the free end of a rib on the belt in FIG. 1 inverted from the FIG. 1 orientation.
Figure 3:
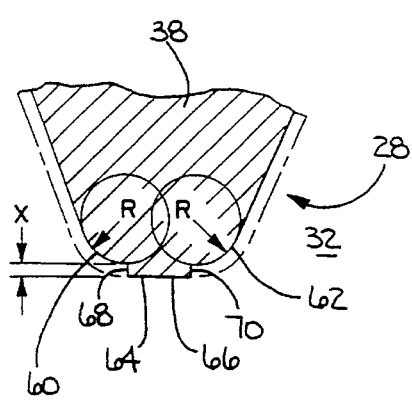
FIG. 3 is an enlarged, fragmentary, cross-sectional view of a rib on the inventive belt in relationship to a cooperating pulley.

In FIGS. 1–3, a power transmission belt, according to the present invention, is shown at 28. The belt 28 illustrated is a V-ribbed belt. It should be understood that the inventive concept can be practiced with various other types of belts. i.e., a V-belt.

The belt 28 has a body 30 with an inside face 31 to engage a cooperating pulley 32, an outside lace 34, and laterally spaced sides 36 (one shown). The belt 28 has laterally spaced, longitudinally extending, V-shaped ribs 38, each having an exposed pulley-engaging surface 39, including oppositely facing, pulley-engaging side surface portions 40,42.

A plurality of laterally spaced, longitudinally extending, load-carrying cords 44 define the belt neutral axis. The cords 44 are made of high strength, low elongation material, such as polyester, nylon and aramid fiber.

The load-carrying cords 44 are embedded in a cushion rubber layer 46 that is made from at least one of chloroprene rubber (CR), hydrogenated nitrile rubber (HNBR), CSM rubber, natural rubber (NR), styrene-butadiene rubber (SBR), butadiene rubber (BR), and the like.

The cushion rubber layer 46 has an outside surface 48 to which a rubber-impregnated canvas layer 50 is bonded. Additional canvas layers can be placed over the canvas layer 50. The canvas layer 50 is preferably made to stretch readily in the longitudinal direction of the belt 28 and is impregnated with a highly elastic rubber material. The canvas layer 50 preferably has woven warp and weft yarns that are cotton or a blended yarn having cotton and synthetic fibers.

The belt 28 has a compression section 51 defined by a rubber layer 52 that is bonded to the inside surface 54 of the cushion rubber layer 46. The rubber making up the compression rubber layer 52 may be the same as that making up the cushion rubber layer 46. The ribs 38 are formed in the compression rubber layer 52.

Laterally extending fibers 56 are embedded in the compression rubber layer 52. The fibers 56 may be a) synthetic fiber yarn consisting of mono-filaments made of nylon, vinylon, polyester, aramid, or a combination thereof, or b) natural fiber yarn such as cotton or pulp. Alternatively, the synthetic and natural fibers can be mixed.

Preferably, the fibers 56 have a length of from 2–10 min. The fibers are preferably present in the amount of 5–30 weight parts of fiber per 100 weight parts of rubber. While the fibers 56 provide reinforcement to the compression rubber layer 52, the fibers 56 are optional and not present in FIG. 3.

The inside surface portion 58 of each rib 38 blends into the side surface portions 40,42 through convex surface portions 60,62. The convex surface portions 60,62 are each preferably defined by the arc of a circle having a radius R centered with the ribs 38.

Between the surface portions 60,62 at the free end 63 of each rib 38, a discrete projection 64 is provided. The projection 64 extends continuously along the entire length of the belt and has a generally squared shape as viewed in cross-section taken transversely to the length of the ribs 38. In a preferred form, the projection 64 has a flat, inside surface portion 66.

The arc on each side of the projection 64 defines part of the rib side surface portions 40,42 and blends into a part 67 of the free end rib surface portion 58. The arc terminates at the projection 64.

Preferably, the belt ribs 38 are formed by a cutting or grinding operation and the components of the belt 28 are arranged so that the flat surface portion 66 on each rib 38 is uncut/unground during the manufacturing process. As a result, no material is removed from the inside surface portion 66 of the projection 64 to thereby limit waste and simplify the cutting/grinding process, with there being a resulting reduction in manufacturing costs.

Oppositely facing, flat, substantially parallel, edges 68,70 extend inwardly from the surface portion 66. The height X of the projection/edges 68,70 between the inside and outside of the belt is not greater than 1.0 mm. Preferably, the height X is not more than 0.3 mm to thereby minimize the amount of material to be removed during the manufacturing process. If the height of the projection 64 exceeds 1.0 mm, the contact area between the ribs 38 and pulley 32 is decreased so that the pulley contacting portion of the belt 28 is more highly stressed and subject to greater wear.

It should be further understood that while the invention is described with respect to a belt having ribs 38 on one side thereof, the invention is equally functional in a belt having V-shaped ribs on both the inside and outside of the belt 28.

Figure 4:
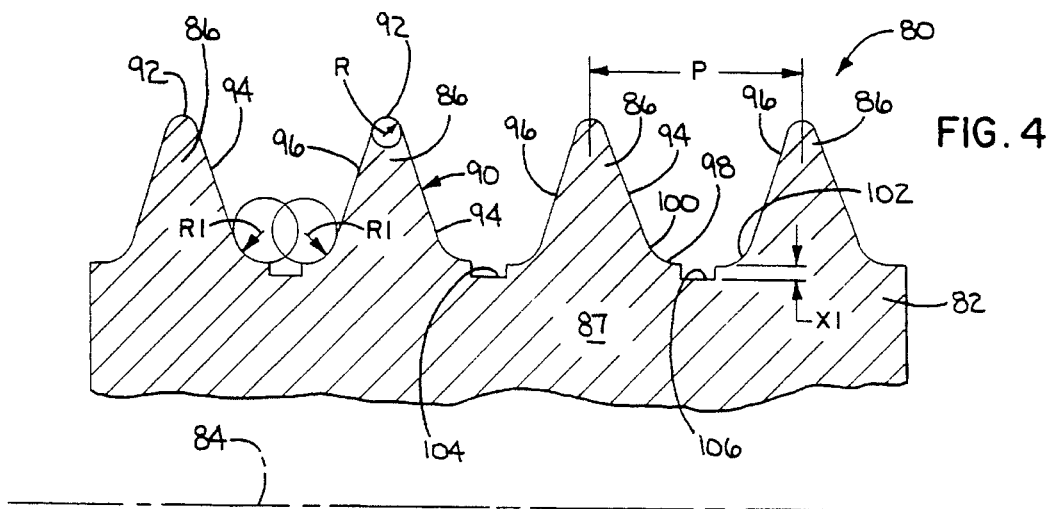
FIG. 4 is a fragmentary, cross-sectional view of a grinding wheel used to form the belt in FIGS. 1–3.

Another aspect of the invention is a grinding wheel 80, as shown in FIG. 4, that can be used to produce the belt 28 in FIGS. 1–3. The wheel 80 has a cylindrical body 82, preferably made from metal. The grinding wheel 80 rotates about an axis 84.

A plurality of axially spaced, radially extending projections 86 are provided on the core 87 of the grinding wheel 80 and have a shape to be complementary to the belt ribs 38 to be defined thereby. The projections 86 may extend partially or completely around the circumference of the grinding wheel 80. The projections 86 are spaced on a pitch P corresponding to the spacing between adjacent ribs 38 on the belt 28 to be formed.

The peripheral grinding surface 90 on the wheel 80 is roughened as by texturing the surface thereof or by depositing discrete particles thereon. For example, diamond particles can be adhered to the surface 90 through known electrodeposition processes.

The radially outermost edge 92 of each projection 86 is convex and defined by the arc of a circle having a radius r.

Adjacent projections 86 have facing grinding surface portions 94,96 which blend into a base surface portion 98. The surface portions 94,96 blend into the base surface portion 98 through concave surface portions 100,102, each preferably defined by the arc of a circle having a radius R1.

An undercut 104 extends radially inwardly from the base surface portion 98 and has a depth X1 that is at least 1.0 mm. The undercut 104 extends through 360° around the grinding wheel 80 and receives the projection 64 on the completed belt 28. A shallower depth than 1.0 mm may cause grinding of the flat surface portion 66 on the projection 64, which has the disadvantages stated above.

In operation, the grinding wheel 80 is advanced against a preformed belt sleeve having the components previously described and shown in FIG. 1. The grinding wheel 80 is advanced against the belt sleeve to the point that the concave surface portions 100,102 come into contact with the rubber defining the ribs 38. The bottom surface 106 of the undercut 104 does not contact the belt sleeve so that no chips are removed from the surface portion 66.

Another advantage of the inventive structure can be seen with the belt 28 incorporated into a washing machine or dryer system shown at 110 in FIGS. 6 and 7. The system 110 includes a driven pulley 112 having a flat outside surface 114 to be engaged and driven by the surrounding belt 28.

The belt 28 is trained around a drive pulley 116 and is maintained at a desired tension by a flat tensioning pulley 118.

In one exemplary system, the outside surface 114 of the driven pulley 112 has a width (w) of 300 mm. The driven pulley 112 has a diameter of 500–600 mm. The drive pulley 116 has a diameter of 14–16 mm and is driven at 3600 rpm. The flat tensioning pulley 118 has a diameter of 30 mm.

The inventive belt 28 is particularly desirable in a system such as that shown at 110 in that the rib surface portions 66 that engage the driven pulley surface 114 are unground/uncut. As a result, the coefficient of friction of the surface portions 66 remains high so that there is positive driving of the pulley 112 effected through the belt 28.

The foregoing disclosure of specific embodiments is intended to be illustrative of the broad concepts comprehended by the invention.

I claim:

1. A grinding wheel for producing a V-shaped rib on a power transmission belt, said grinding wheel comprising:

a cylindrical body having a central axis;

a plurality of axially spaced, radially extending projections with there being facing grinding surface portions on axially adjacent projections;

a radially facing base surface portion between axially adjacent projections; and an undercut extending radially inwardly from the base surface portion and continuously through 360° around the cylindrical body.

2. The grinding wheel according to claim 1 wherein the undercut has an radial extent of at least 1.0 mm inwardly of the base surface portion.

3. The grinding wheel according to claim 1 wherein the radially extending projections have a radial outermost edge that is convex.

4. The grinding wheel according to claim 1 wherein the facing grinding surface portions comprise roughened surfaces.

5. The grinding wheel according to claim 4 wherein the facing grinding surface portions have diamond particles deposited thereon.

6. The grinding wheel according to claim 4 wherein the material defining the facing grinding surface portions is shaped to define the roughened surfaces.

7. The grinding wheel according to claim 1 wherein the base surface portions and facing grinding surface portions are joined by a concave surface portion.

8. The grinding wheel according to claim 7 wherein the concave surface portion is defined by an arc of a circle.

9. The grinding wheel according to claim 1 wherein the grinding wheel has a circumference and the projections extend only partially around the circumference of the grinding wheel.

10. The grinding wheel according to claim 1 in combination with an endless power transmission belt comprising a rubber material, said power transmission belt having a surface that is ground by the grinding wheel.

11. The grinding wheel according to claim 10 in combination with an endless power transmission belt sleeve, said power transmission belt sleeve having a surface that is ground by the grinding wheel.

12. The grinding wheel according to claim 1 wherein the undercut does not axially intersect any of the projections.

13. A grinding wheel for producing a V shape in a workpiece, said grinding wheel comprising:

a cylindrical body having a central axis;

a plurality of radially extending projections each being spaced fully from the others in an axial direction, there being facing grinding surface portions on axially adjacent projections;

a radially faring base surface portion between the axially adjacent projections; and an undercut extending radially inwardly from the base surface portion and continuously through 360° around the cylindrical body.

* * * * *